Oct. 20, 1970 | TOJU HATA ET AL | 3,535,309

ANTIBIOTICS AND THEIR PRODUCTION

Filed Sept. 1, 1967 | 14 Sheets-Sheet 1

TOJU HATA
AKIHIRO MATSUHAE
SATOSHI ŌMURA
JINNOSUKE ABE
TETSUO WATANABE
INVENTORS

BY Jacobs & Jacobs

TOJU HATA
AKIHIRO MATSUMAE
SATOSHI OMURA
JINNOSUKE ABE
TETSUO WATANABE
INVENTORS

BY
Jacobs & Jacobs

INVENTORS
TOJU HATA
AKIHIRO MATSUHAE
SATOSHI ŌMURA
JINNOSUKE ABE
TETSUO WATANABE
BY Jacobs & Jacobs
ATTORNEYS

TOJU HATA
AKIHIRO MATSUHAE
SATOSHI ŌHURA
JINNOSUKE ABE
TETSUO WATANABE
INVENTORS

BY Jacobs & Jacobs

INVENTORS
TOJU HATA
AKIHIRO MATSUMAE
SATOSHI ŌMURA
JINNOSUKE ABE
TETSUO WATANABE

BY Jacobs & Jacobs
ATTORNEYS

Oct. 20, 1970 TOJU HATA ET AL 3,535,309

ANTIBIOTICS AND THEIR PRODUCTION

Filed Sept. 1, 1967 14 Sheets-Sheet 6

TOJU HATA
AKIHIRO MATSUMAE
SATOSHI ŌMURA
JINNOSUKE ABE
TETSUO WATANABE
INVENTORS

BY Jacobs & Jacobs

TOJU HATA
AKIHIRO MATSUMAE
SATOSHI ŌMURA
JINNOSUKE ABE
TETSUO WATANABE
INVENTORS
BY Jacobs & Jacobs INVENTORS
TOJU HATA
AKIHIRO MATSUMAE
SATOSHI ŌMURA
JINNOSUKE ABE
TETSUO WATANABE
BY Jacobs & Jacobs
ATTORNEYS

TOJU HATA
AKIHIRO MATSUMAE
SATOSHI ŌMURA
JINNOSUKE ABE
TETSUO WATANABE
INVENTORS

BY
Jacobs & Jacobs

INVENTORS
TOJU HATA
AKIHIRO MATSUMAE
SATOSHI OMURA
JINNOSUKE ABE
TETSUO WATANABE
BY Jacobs & Jacobs
ATTORNEYS Oct. 20, 1970 TOJU HATA ET AL 3,535,309

ANTIBIOTICS AND THEIR PRODUCTION

Filed Sept. 1, 1967 14 Sheets-Sheet 11

TOJU HATA
AKIHIRO MATSUMAE
SATOSHI ŌMURA
JINNOSUKE ABE
TETSUO WATANABE
INVENTORS

BY Jacobs & Jacobs

Oct. 20, 1970 TOJU HATA ET AL 3,535,309

ANTIBIOTICS AND THEIR PRODUCTION

Filed Sept. 1, 1967 14 Sheets-Sheet 12

INVENTORS
TOJU HATA
AKIHIRO MATSUHAE
SATOSHI ŌMURA
JINNOSUKE ABE
TETSUO WATANABE

BY Jacobs & Jacobs
ATTORNEYS

Oct. 20, 1970 TOJU HATA ET AL 3,535,309

ANTIBIOTICS AND THEIR PRODUCTION

Filed Sept. 1, 1967 14 Sheets-Sheet 13

TOJU HATA
AKIHIRO MATSUKAE
SATOSHI ŌHURA
JINNOSUKE ABE
TETSUO WATANABE
INVENTORS

BY Jacobs & Jacobs

TOJU HATA
AKIHIRO MATSUNAE
SATOSHI ŌMURA
JINNOSUKE ABE
TETSUO WATANABE
INVENTORS

BY
Jacobs & Jacobs 3,535,309
Patented Oct. 20, 1970

3,535,309

ANTIBIOTICS AND THEIR PRODUCTION

Toju Hata, Akihiro Matsumae, and Satoshi Omura, Tokyo, Jinnosuke Abe, Shizuoka-ken, and Tetsuo Watanabe, Tokyo, Japan, assignors to The Kitasato Institute and Toyo Jozo Kabushiki Kaisha Filed Sept. 1, 1967, Ser. No. 665,059
Claims priority, application Japan, Sept. 5, 1966, 41/58,224, 41/58,225, 41/58,226, 41/58,227; Sept. 21, 1966, 41/62,164, 41/62,165; Feb. 25, 1967, 42/11,734, 42/11,735
Int. Cl. C07c 47/18
U.S. Cl. 260—210 9 Claims

ABSTRACT OF THE DISCLOSURE

New antibiotics derived from *Streptomyces kitasatoensis* are provided as well as procedure for producing and isolating seven compounds designated as $A_3$ to $A_9$. They are differentiated from Leucomycin A- and B-groups and have broad spectra against a variety of microorganisms and favorable minimum inhibitory concentrations. The new antibiotics are derived from microorganisms of *Streptomyces kitasatoensis.*

Figure 1:
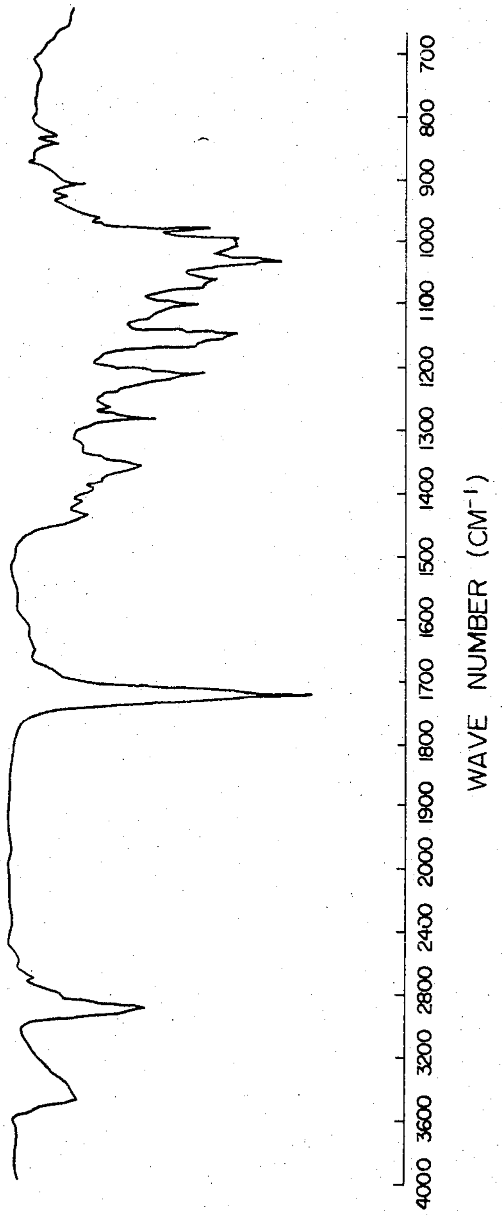

This invention relates to new antibiotic agents and further to a process for preparing the same. More particularly, it is concerned with a novel antibiotic substance of the formula:

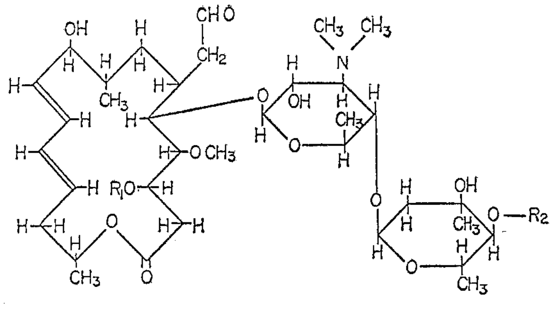

wherein $R_1$ is hydrogen and $R_2$ is acetyl, propionyl or butyryl; or wherein $R_1$ is acetyl and $R_2$ represents acetyl, propionyl, butyryl or isovaleryl and non-toxic salts thereof.

The antibiotic substance called Leucomycin is a kind of macrolide antibiotic which was prepared in 1953 from the cultured broth of *Streptomyces kitasatoensis.* The physical and chemical properties and biological particulars of the said Leucomycin were disclosed in "Journal of Antibiotics, Ser. A," 1953, vol. VI, No. 2, pp. 87–89.

The taxonomical properties of *Streptomyces kitasatoensis* were disclosed in the same Journal, 1953, vol. VI. No. 3, pp. 109–112. These properties and particulars were also disclosed in Japanese patent publication No. 2,299/1955, now Japanese Pat. No. 214,984.

Several of us investigated the antibiotic Leucomycin and found that it can be divided generally into two groups, or more particulary into Leucomycin A-group and Leucomycin B-group and further that the former comprises two kinds of substances: Leucomycin $A_1$ and -$A_2$; and the latter comprises Leucomycin $B_1$, -$B_2$, -$B_3$, and -$B_4$, as disclosed in Japanese patent publication Nos. 18,750/1960 and 98/1961 now Japanese Pat. Nos. 278,546 and 278,547, respectively.

It is the main object of the present invention to provide several new effective antibiotics different from those denoted above as Leucomycin A, -B, -$A_1$, -$A_2$, -$B_1$, -$B_2$, -$B_3$ and -$B_4$, and herein called $A_3$-, $A_4$-, $A_5$-, $A_6$-, $A_7$-, $A_8$- and $A_9$-compounds denoted throughout the present specification and particularly and definitely pointed out by the formula disclosed hereinbefore.

Furthermore, the present invention provides a novel process for the preparation and isolation of these new antibiotics, Leucomycin $A_3$, -$A_4$, -$A_5$, -$A_6$, -$A_7$, -$A_8$ and -$A_9$, or mixtures of these new antibiotics, although *Streptomyces kitasatoensis* is used as before as the antibiotic-producing microorganism.

The new antibiotic agents described hereinbefore are formed during the cultivation under carefully controlled conditions by the microorganisms *Streptomyces kitasatoensis* which had been deposited at the Northern Utilization Research and Development Division, U.S. Department of Agriculture, Peoria, Ill. U.S.A., and added to its collection of microorganisms as NRRL 2486 and 2487. The description of the organisms are set forth in the following.

Morphological findings:

A mycelium was formed with the display of slightly curved hyphae on Czapek's agar media although development of aerial mycelium was poor.

By cultivating on starch, asparagine or tyrosine agar, thin grayish white aerial mycelia grew after several days, sometimes cottony or flocculous aerial mycelia appeared. In some instances the aerial mycelium grew slowly and sparsely. Later the color of the aerial mycelia on starch or asparagine agar was changed white to yellow or light tan yellow. Ordinarily the primary and secondary whirls will grow in an amount that ranges from a few to many, however sometimes while formation becomes progressively degenerated until none can be detected.

Sometimes, few spirals of hyphae were observed.

Cultural findings:

(1) Czapak's agar.—Growth: yellow to yellowish brown, penetrating into the medium. Aerial mycelia: none to grayish white. Soluble pigment; none to yellowish.

(2) Krainsky's agar.—Growth: yellowish white, center raised, penetrating into the agar, spreading thin edge. Aerial mycelia: thin, grayish white or yellow. Soluble pigment: none to light yellowish. In the course of incubation small cottony patches which turned from white to light tan yellow appeared and whole surface was covered by them.

(3) Nutrient agar.—Growth: brown restricting with raised center, folds from center to edge. Aerial mycelia: none. Soluble pigment: brown.

(4) Glucose agar.—Growth: brown to dark brown, penetrating into agar: Aerial mycelia: very faint, grayish or mouse gray. Soluble pigment: brown.

(5) Starch agar.— Growth: colorless to yellow or yellowish brown, penetrating into medium, center raised and brown. Aerial mycelia: thin. In the course of cultivation, white cottony or flocculous aerial mycelia grew rapidly, and the whole surface of the medium was soon covered, and tinged with yellowish color. Soluble pigment: none or slight.

(6) Tyrosine agar.—Growth: brown to dark brown, penetrating into medium. Aerial mycelia: grayish white and thin, later cottony. Tyrosinase: positive. Sometimes tyrosinase production was negative in some strains, giving faint yellowish coloring of medium. Otherwise abundant production of grayish black pigment was observed.

(7) Potato plug.—Growth: yellowish brown and wrinkled. Aerial mycelia: none or white, thin sometimes became cottony and light tan yellowish. Color of plug: unchanged or light brown or sometimes blackening to show a chromogenic type.

(8) Carrot plug.—Growth: brown to dark brown. Aerial mycelia: none or whitish gray. Color of plug: unchanged.

(9) Gelatin stab.—Growth: poor, dark brown. Liquefaction: slow but complete, about a half of the medium in 20 days, and only a droplet of liquefied portion was observed in some strains.

(10) Milk.—Coagulation: weak or negative. Peptonization: positive. Color of ring: yellow to brownish yellow to dark brown.

(11) Egg medium.—Growth: grayish brown. Aerial mycelia: thin, spreading, grayish white, became cottony. Soluble pigment: purple.

(12) Serum.—Growth: brownish yellow. Aerial mycelia: none. Soluble pigment: brown.

(13) Blood.—Growth: dark brown. Aerial mycelia: none. Hemolysis: positive.

(14) Nitrate reduction.—Positive.

(15) Starch hydrolysis.—Positive.

(16) Cellulose decomposition.—Negative.

(17) Hydrogen sulfide production.—Positive.

(18) Utilization of carbon sources.—Utilized: glucose, starch, dextrin, glycerol, galactose, maltose, trechalose, sucrose, inositol, sorbitol, sodium succinate, sodium citrate, sodium acetate. Not utilized: xylose, rhamnose, raffinose, lactose, arabinose, mannose, mannitol, inulin, dulcitol, fructose, salicine, eskulin.

Above described morphological characteristics of *Streptomyces kitasatoensis* were mainly classified into four types of colony form including natural or induced mutant strains, named type A, B, C, D, respectively.

Type B resembles the original type.

Type D shows irregular form.

Thickness of colony.—Type A> Type B> Type C.

Aerial mycelium.—Types A and C: none. Type B: poor.

Color of colony surface.—Type A: yellowish, glistening. Types B and C: brown.

Diameter of colony.—Type B> Type A. Type C: very small.

Foldings.—Type A: less than three. Type B: more than three. Type C: none.

The cultivation of the organisms *Streptomyces kitasatoensis* may take place in a variety of liquid culture media. Media which are useful for the production of the novel antibiotics may include an assimilable source of carbon such as lactose, maltose, dextrine, molasses, starch, glucose, corn syrup, sugar, glycerine; fatty acids such as stearic acid, palmitic acid, acetic acid, propionic acid, etc.; an assimilable source of organic and inorganic nitrogen such as corn steep liquor, yeast or its extract, meat extract, meat juice, peptone, milk, cotton seed oil, casein hydrolysate, amino acids, soy bean powder, etc., and such as inorganic nitrate, ammonium salts and the like. These nitrogen sources are used separately or in combination. This applies to the carbon sources. The aforementioned carbon and nitrogen sources are only illustrative, and thus have not been set forth in a limiting sense for the invention. The media further include a source of inorganic anions and cations, such as potassium, sodium, calcium in the form of phosphate, carbonate, chloride, etc. Trace elements such as boron, molybdenum, copper, nickel, cobalt, iron, etc., especially in the form of, for instance, ferrous or ferric chloride or sulfate, or cuprous or cupic chloride or sulfate, or the like, may be added to the media.

For the culture of streptomyceteous micro-organisms belonging to *Streptomyces kitasatoensis*, either the liquid culture process or the solid culture process may be employed. For industrial purposes, however, the submerged aeration culture is most advantageous.

For carrying out the culture of the organisms for the preparation of crude antibiotics according to this invention, the culturing temperature is kept generally at 20–40° C., preferably at 25–35° C. The culturing period, when the aeration is employed, extends generally to 2–10 days. When the culture broth reveals a highest potency in antibiotic performance, the cultivation should naturally be terminated. In order to separate and purify the crude antibiotic products from the broth, various conventional processes commonly employed for this purpose, such as solvent extraction, adsorbent treatment, distribution chromatography, crystallization from solvents, and the like techniques, may be employed.

In order to prepare a solvent extract containing the crude antibiotics, the filtrate of the culture broth of the *Streptomyceter* is subjected to extraction generally at a neutral pH of 7 to an alkaline pH, preferably pH 7.5–9, with use of a water immiscible organic solvent, such as butanol, propanol or the like; ketones such as methyl ethyl ketone or the like; esters such as ethyl acetate, butyl acetate or the like; chloroform; benzene; xylol; toluol, etc. The extract is mixed with a proper quantity of dilute acid of pH 2–4 so as to control the aqueous liquid to pH 2–4, in order to transfer the effective antibiotics to the aqueous phase which is then mixed with a water immiscible organic solvent while adjusting the pH to 7.5–9.0. This adjustment may be carried out in advance of, in the course of, or after the mixing step. This transfer operation is repeated several times until sufficiently condensed crude antibiotics are contained in the final organic solvent solution which is then subjected to a distillation in vacuo or a concentration step. In this way, an antibiotic composition which includes $A_3$-, $A_4$-, $A_5$-, $A_6$-, $A_7$-, $A_8$- and $A_9$-, compounds can be separated. Or, alternatively, by an addition of petroleum ether, the antibiotics can be precipitated. In still another way, the final concentrated solution containing the effective antibiotics may be subjected to lyophilization for the desired separation of the crude products.

The concentrated solution may be alternatively treated so that it is adjusted to pH 7.0–9.0 so as to precipitate the effective antibiotics in the form of their free bases.

The thus obtained products have the following properties.

Appearance: white powder.

Melting point: 128–145° C.

Elemental analysis: C, 60.00%; H, 8.80%; N, 1.68%, as found.

Ultraviolet absorption spectrum:

$$\lambda_{\text{max.}}^{\text{methanol}}:231 m\mu$$

$$E_{1\,\text{cm.}}^{1\%}:353$$

Molecular weight (by titration): ca. 800.

Optical rotation: $[\alpha]_D^{25}$: −53° (c.=1, chloroform).

This antibiotic composition is soluble in lower alcohols such as methanol, ethanol and the like; esters such as ethyl acetate, butyl acetate and the like; ketones such as acetone, methyl isobutyl ketone and the like; benzene; chloroform and the like; difficulty soluble in water; insoluble in petroleum ether.

Color reactions on the new antibiotic composition are as follows:

Negative.—Adamkiewicz's reaction; biuret reaction; Milon reaction; xanthroprotein reaction.

Positive.—Anthrone reaction; Schriwanoff's reaction; Molisch's reaction; conc. sulfuric acid reaction; tetrazolium reaction.

When it is desired to isolate several constituent antibiotic compounds $A_3$, -$A_4$, -$A_5$, -$A_6$, -$A_7$, -$A_8$ and -$A_9$, from the said composition, the latter is further treated by the chromatography technique using silica gel, cellulosic material, activated alumina or the like, by he counter current distribution technique, or the like.

As an example the antibiotic composition is adsorbed by a suitable quantity of silica gel, activated alumina or the like material which is commonly used in the conventional chromatographic processing and then dissolved in a combination solvent system, for instance, benzene/acetone, benzene/methanol or the like. By further treating the solvent system as conventionally, each of the constituent compounds can be isolated in the form of white prisms, with exception of $A_5$-, $A_7$- and $A_9$- which are in the form of white crystalline powder.

Analysis $A_3$-compound.—Found: C, 60.94%; H, 8.36%; N, 1.75%. Theoretical: C, 60.92%; H, 8.40%; N, 1.69%, based upon the proposed formula: $C_{42}H_{69}NO_{15}$.

$A_4$-compound.—Found: C, 60.80%; H, 8.13%; N, 1.65%. Theoretical: C, 60.50%; H, 8.30%; N, 1.72%, based upon the proposed formula: $C_{41}H_{67}NO_{15}$.

$A_5$-compound.—Found: C, 60.98%; H, 8.83%; N, 1.95%. Theoretical: C, 60.66%; H, 8.50%; N, 1.81%, based upon the formula: $C_{39}H_{65}NO_{14}$.

$A_6$-compound.—Found: C, 60.15%; H, 8.10%; N, 1.71%. Theoretical: C, 60.06%; H, 8.19%; N, 1.75%, based upon the formula: $C_{40}H_{65}NO_{15}$.

$A_7$-compound.—Found: C, 60.10%; H, 8.40%; N, 1.90%. Theoretical: C, 60.22%; H, 3.88%; N, 1.85%, based upon the formula: $C_{38}H_{63}NO_{14}$.

$A_8$-compound.—Found: C, 59.71%; H, 8.12%; N, 1.80%. Theoretical: C, 59.60%; H, 8.08%; N, 1.78%, based upon the formula: $C_{39}H_{63}NO_{15}$.

$A_9$-compound.—Found: C, 59.65%; H, 8.31%; N, 1.91%. Theoretical: C, 59.74%; H, 8.27%; N, 1.88%, based upon our theoretical formula: $C_{37}H_{61}NO_{14}$.

Values of pKa' (50%-ethanol):

| | |
|---|---|
| $A_3$-compound | 6.70 |
| $A_4$-compound | 6.71 |
| $A_5$-compound | 6.69 |
| $A_6$-compound | 6.72 |
| $A_7$-compound | 6.73 |
| $A_8$-compound | 6.75 |
| $A_9$-compound | 6.75 |

Ultraviolet absorption spectrum in mμ:

$A_3$--- $\lambda_{max.}^{methanol}$: 231–232, $E_{1\,cm.}^{1\%}$: 351
$A_4$--- $\lambda_{max.}^{methanol}$: 231, $E_{1\,cm.}^{1\%}$: 325
$A_5$--- $\lambda_{max.}^{methanol}$: 232, $E_{1\,cm.}^{1\%}$: 370
$A_6$--- $\lambda_{max.}^{methanol}$: 231, $E_{1\,cm.}^{1\%}$: 375
$A_7$--- $\lambda_{max.}^{methanol}$: 232, $E_{1\,cm.}^{1\%}$: 405
$A_8$--- $\lambda_{max.}^{methanol}$: 232, $E_{1\,cm.}^{1\%}$: 380
$A_9$--- $\lambda_{max.}^{methanol}$: 232, $E_{1\,cm.}^{1\%}$: 395

Figure 2:
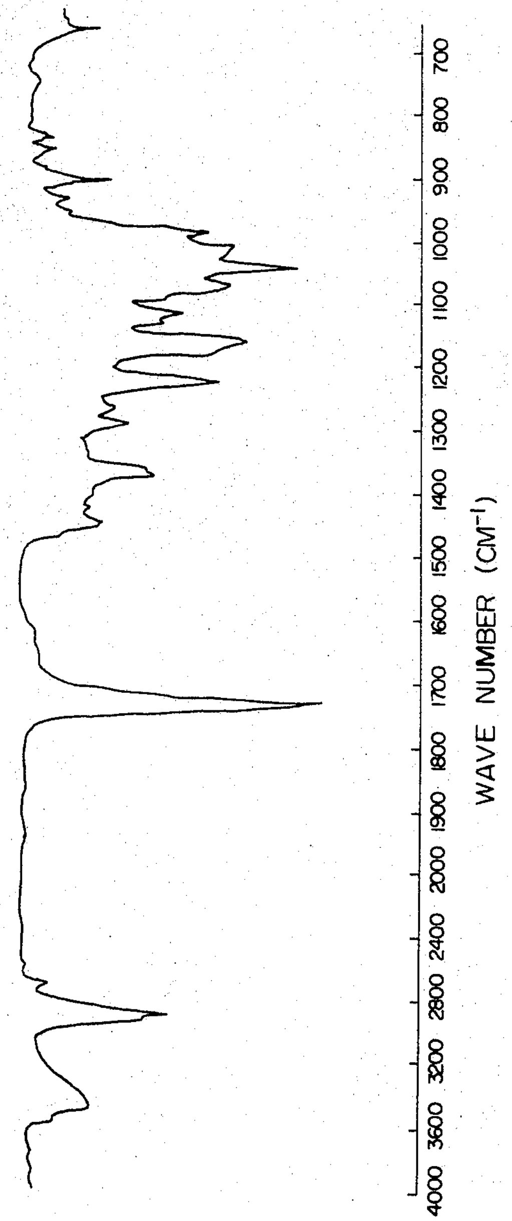
Figure 3:
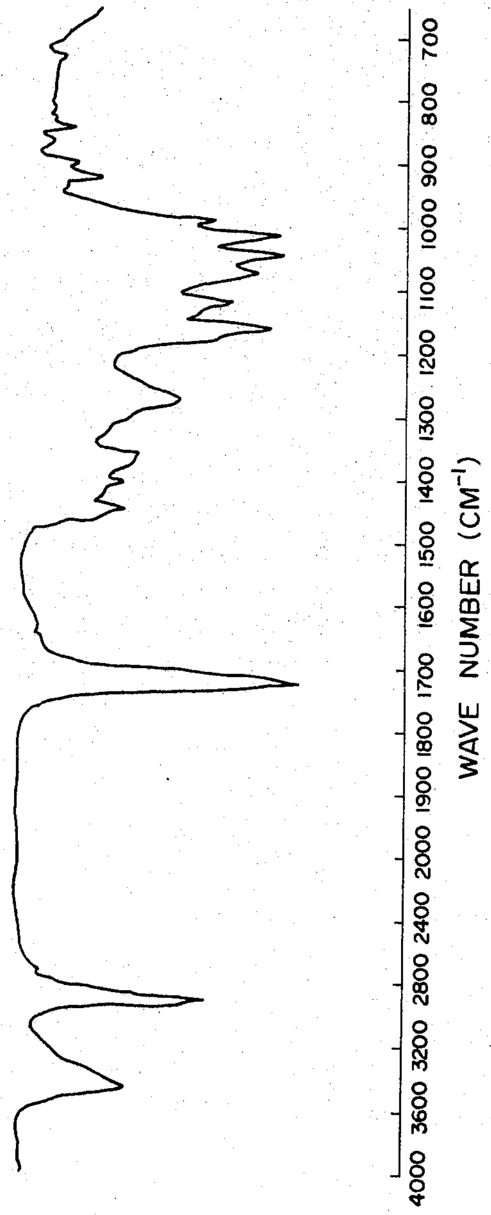
Figure 4:
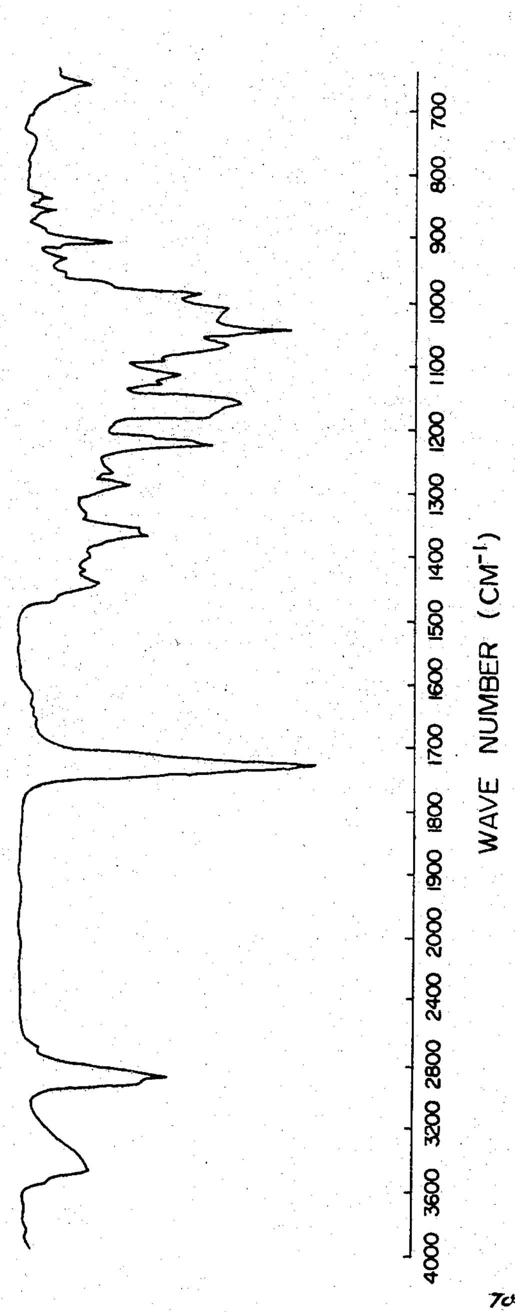
Figure 5:
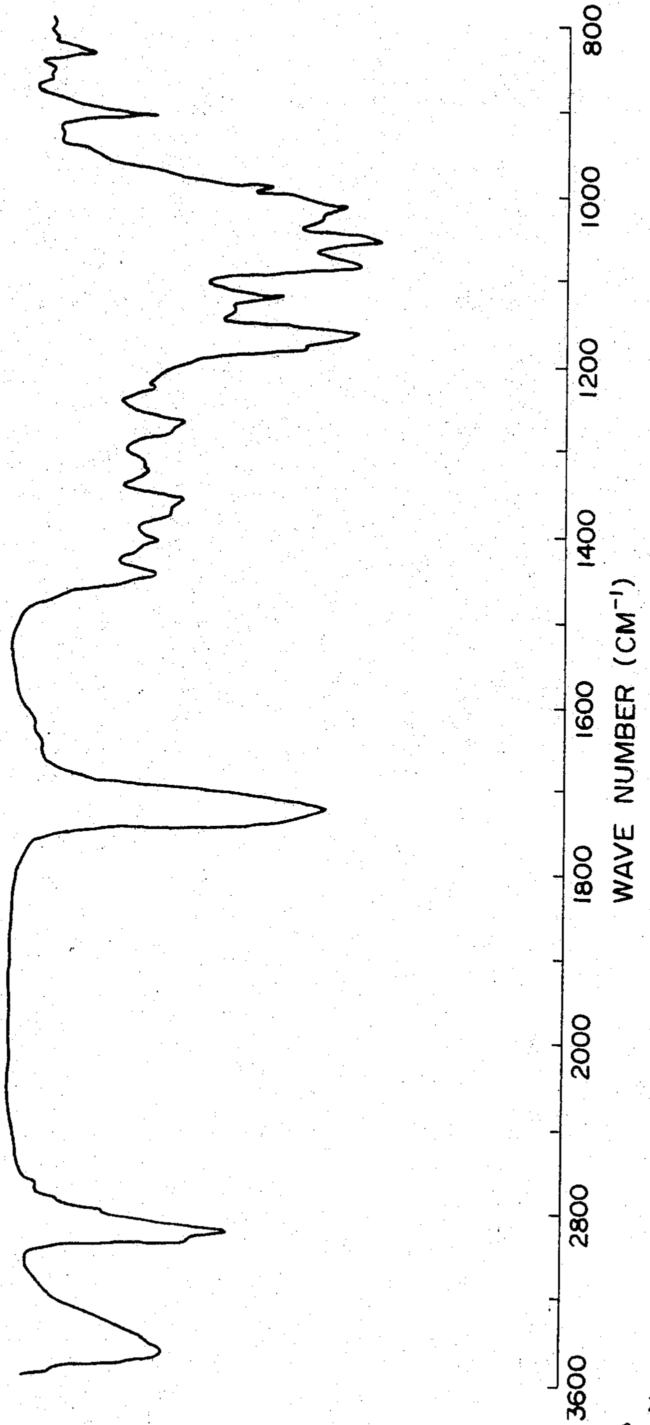
Figure 6:
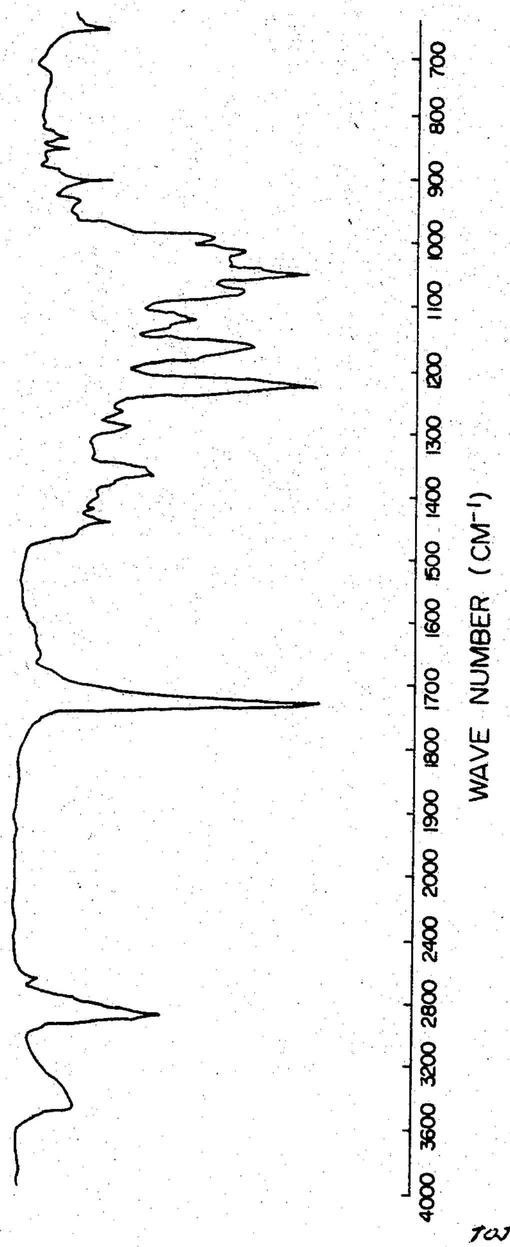
Figure 7:
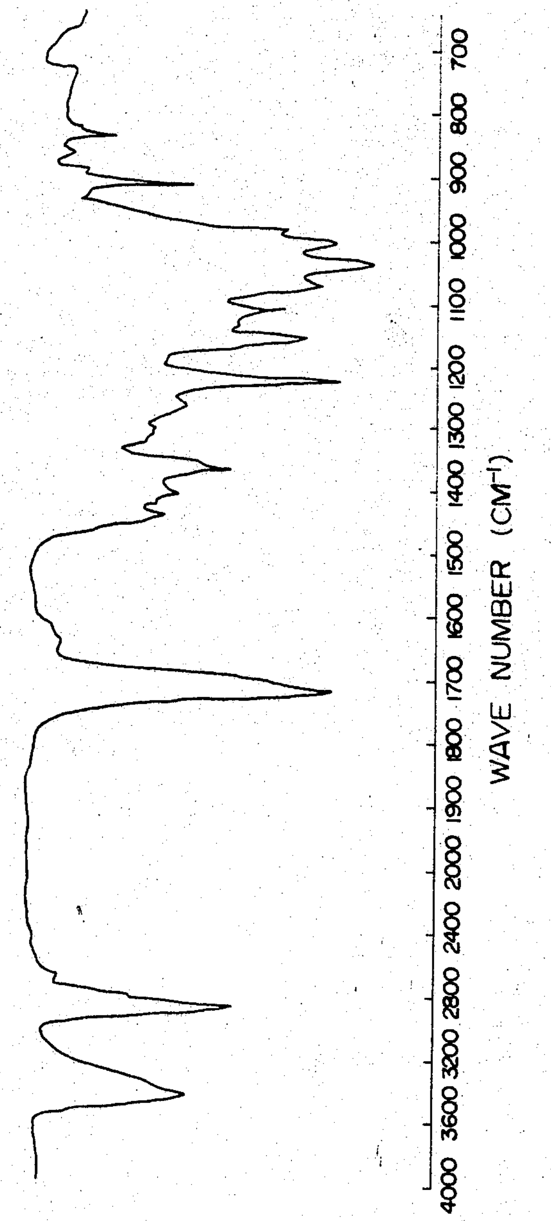

Infrared absorption spectrum.—Those taken with use of carbon tetrachloride solutions are shown in FIGS. 1–7, respectively in the order of $A_3$–$A_9$-compounds.

Figure 8:
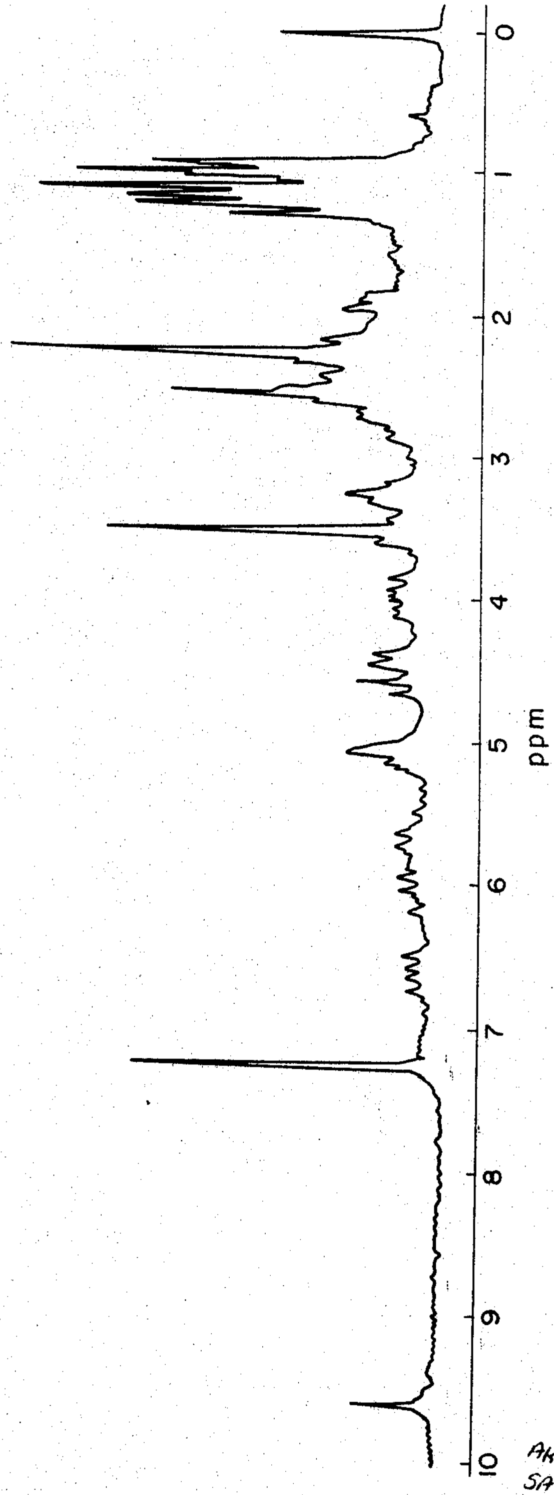
Figure 9:
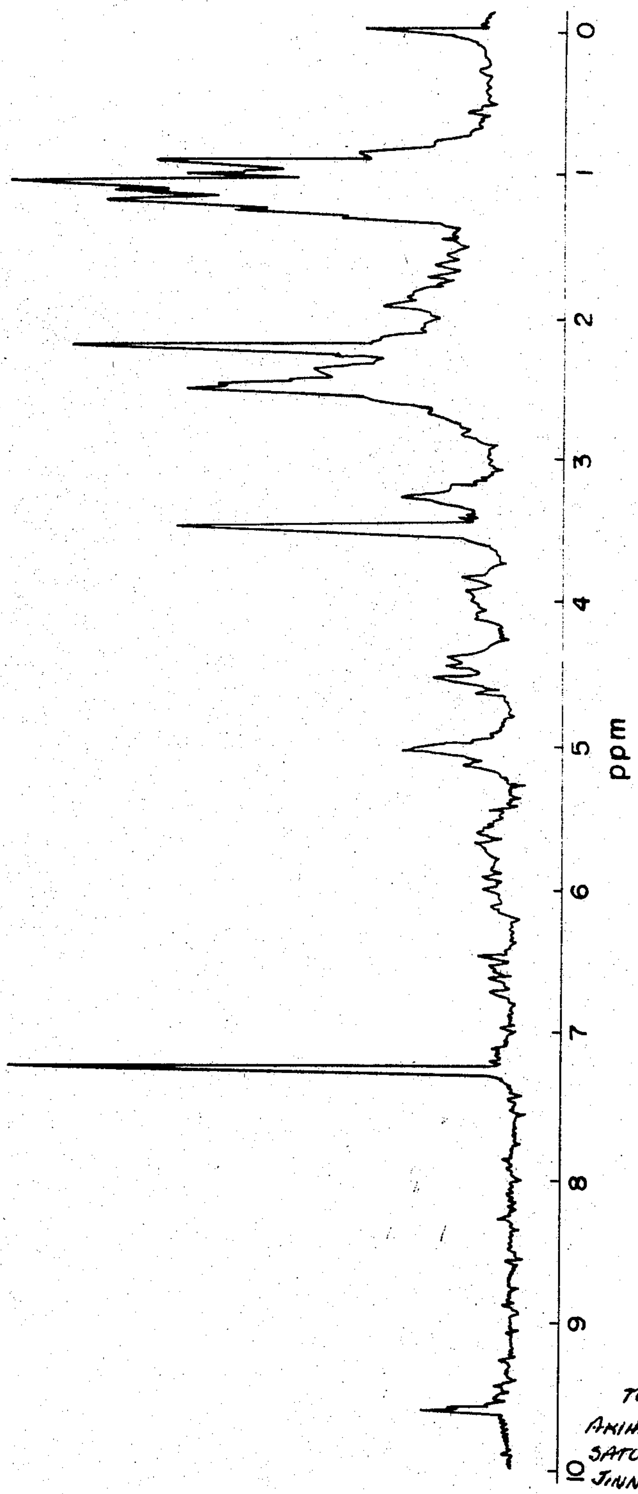
Figure 10:
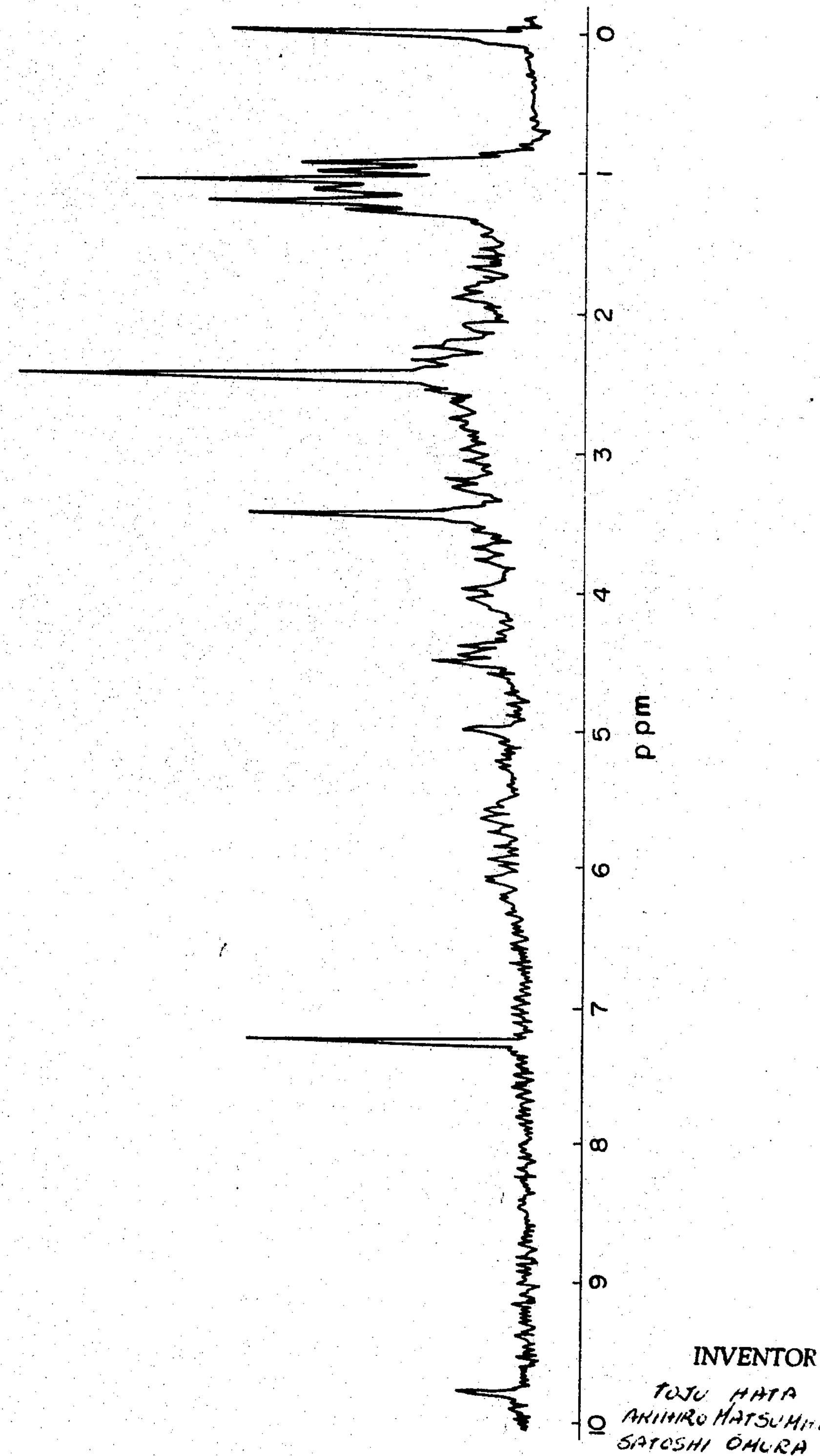
Figure 11:
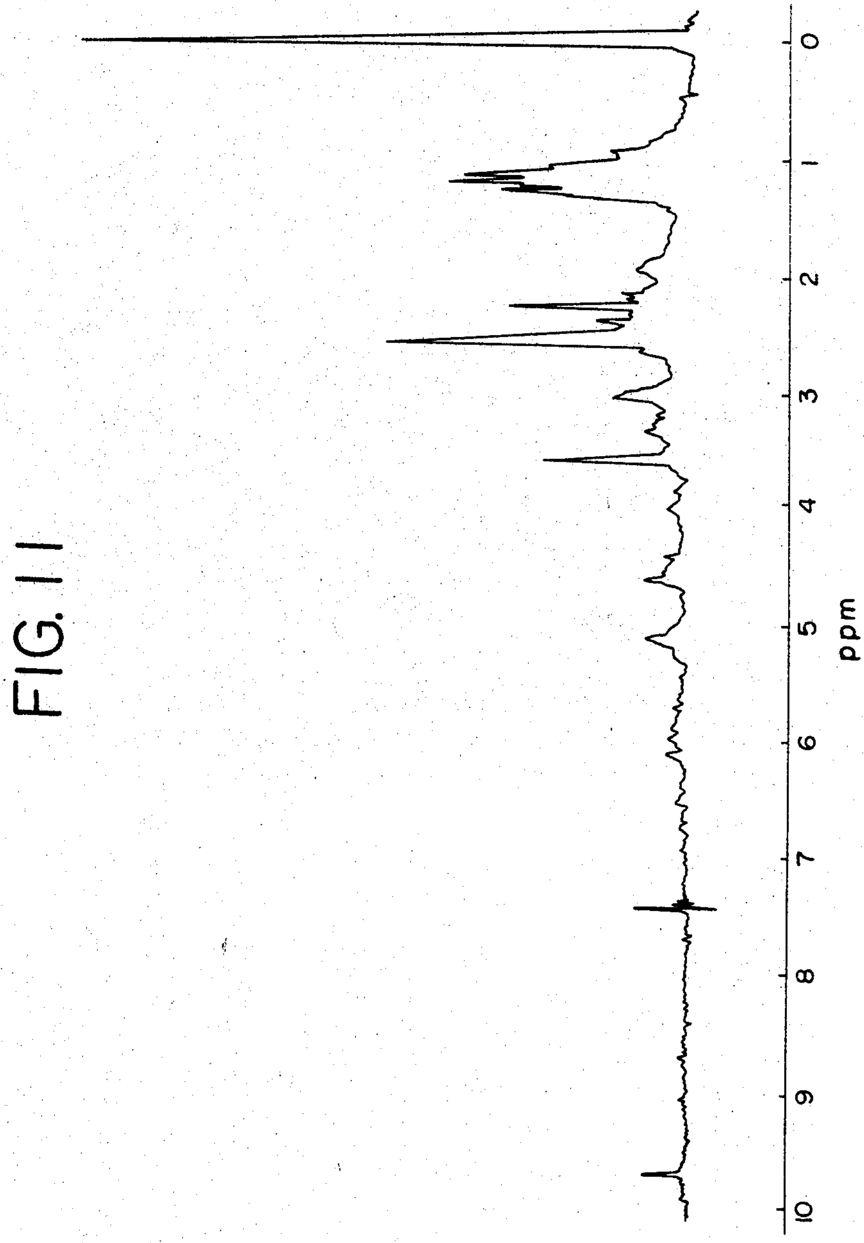
Figure 12:
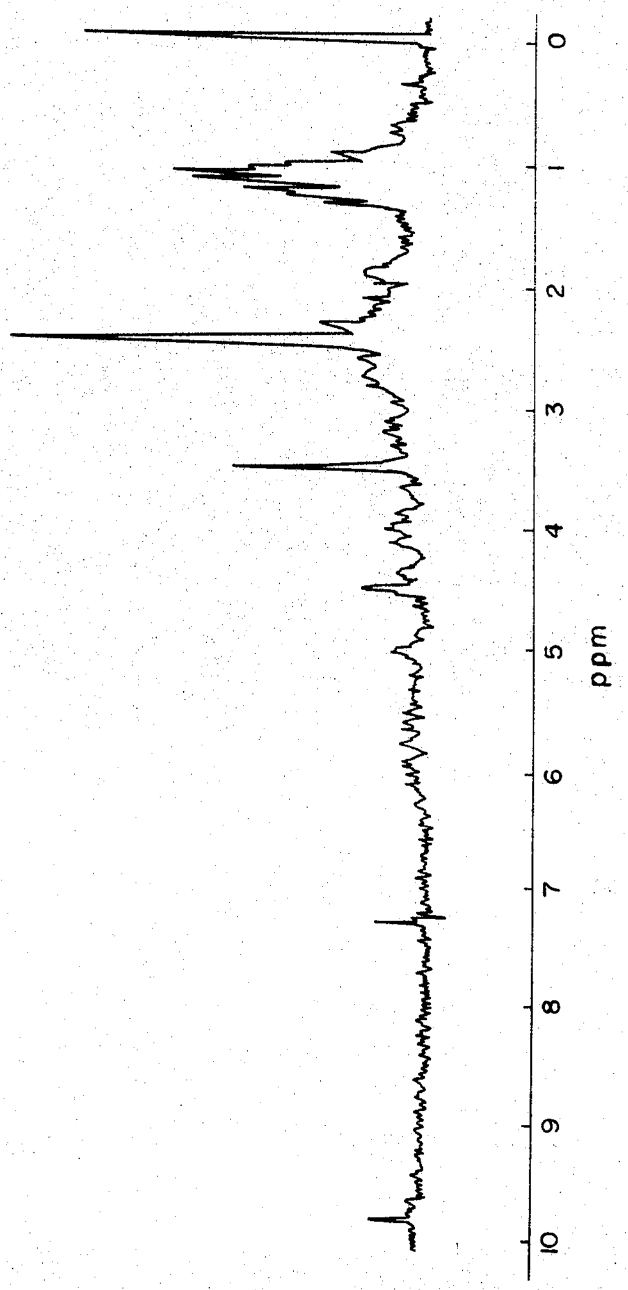
Figure 13:
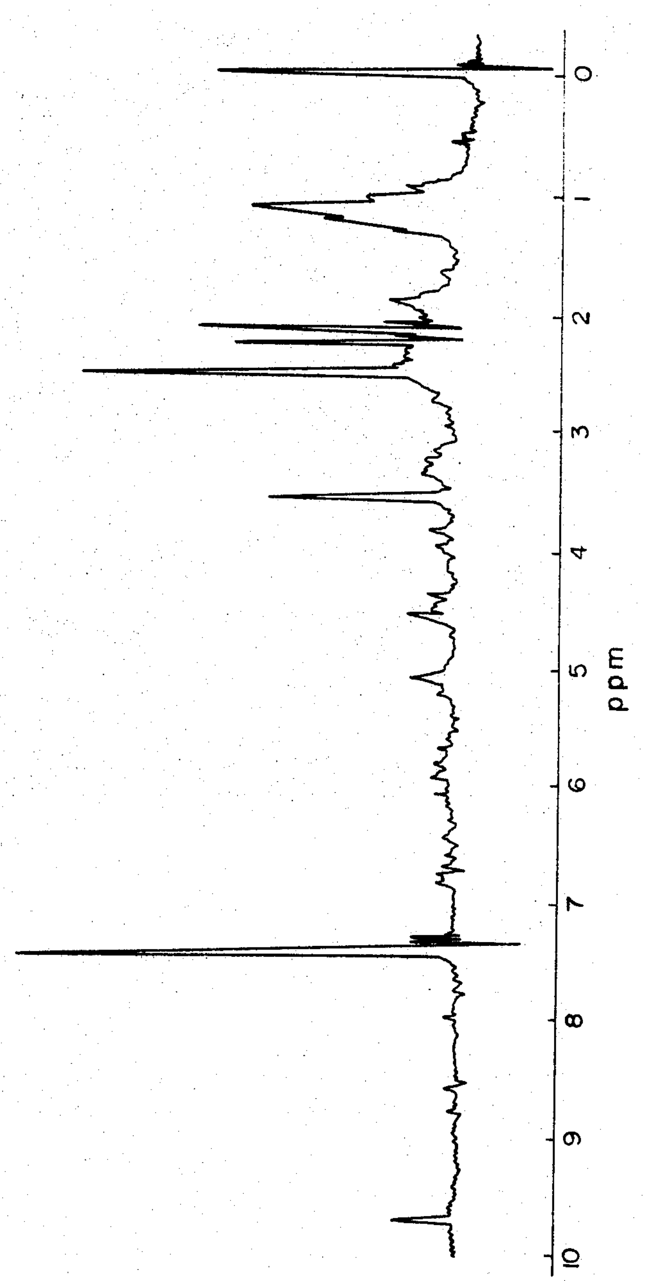
Figure 14:
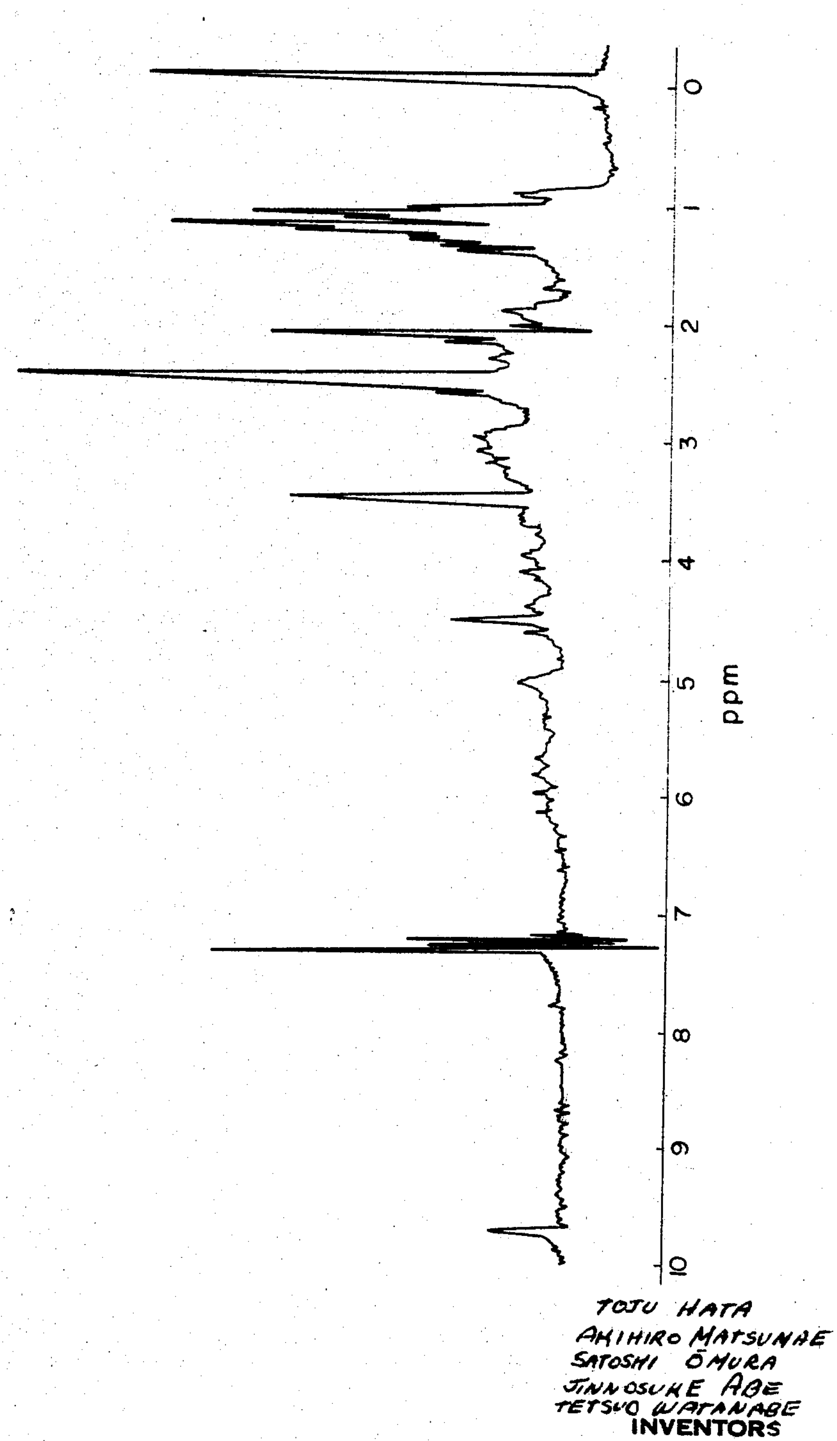

Nuclear magnetic resonance spectrums are shown in FIGS. 8–14, respectively, in the order of $A_3$–$A_9$-compounds.

Solubility.—The following Table I shows respective solubility of the compounds.

TABLE I.—SOLUBILITY OF COMPOUNDS

| Compound | $A_3$- | $A_4$- | $A_5$- | $A_6$- | $A_7$- | $A_8$- | $A_9$- |
|---|---|---|---|---|---|---|---|
| Solvent: | | | | | | | |
| Methanol | Sol | Sol | Sol | Sol | Sol | Sol | Sol. |
| Ethanol | Sol | | | | | | Sol. |
| Ethyl acetate | Sol | | | | | | Sol. |
| Butyl acetate | Sol | | | | | | Sol. |
| Acetone | Sol | | | | | | Sol. |
| Methyl isobutyl ketone | Sol | | | | | | Sol. |
| Benzene | Sol | | | | | | Sol. |
| Chloroform | Sol | | | | | | Sol. |
| Water | Diff | | | | | | Diff. |
| Petroleum ether | Insol | | | | | | Insol. |

Found molecular weights determined by known titration methods are as follows:

| | |
|---|---|
| $A_3$-compound | 835±15 |
| $A_4$-compound | 820±15 |
| $A_5$-compound | 789±10 |
| $A_6$-compound | 801±10 |
| $A_7$-compound | 770±15 |
| $A_8$-compound | 790±10 |
| $A_9$-compound | 760±10 |

| Melting points: | ° C. |
|---|---|
| $A_3$-compound | 120–121 |
| $A_4$-compound | 126–127 |
| $A_5$-compound | 115–117 |
| $A_6$-compound | 135–127 |
| $A_7$-compound | 111–113 |
| $A_8$-compound | 147–149 |
| $A_9$-compound | 120–121 |

Optical rotation:

| | |
|---|---|
| $A_3$-compound | $[\alpha]_D^{25}$: −55.4° C. (c.=1, chloroform). |
| $A_4$-compound | $[\alpha]_D^{25}$: −50° C. (c.=1, chloroform). |
| $A_5$-compound | $[\alpha]_D^{25}$: −52° C. (c.=1, chloroform). |
| $A_6$-compound | $[\alpha]_D^{25}$: −56° C. (c.=1, chloroform). |
| $A_7$-compound | $[\alpha]_D^{25}$: −65.0° C. (c.=1.3, chloroform). |
| $A_8$-compound | $[\alpha]_D^{25}$: −58.3° C. (c.=1.8, chloroform). |
| $A_9$-compound | $[\alpha]_D^{25}$: −65.1° C. (c.=1.3, chloroform). |

Color reactions of $A_3$- to $A_9$-compounds are the same as disclosed hereinbefore with respect to the antibiotic composition, as follows:

Negative.—Adamkiewicz's reaction; biuret reaction; Milon reaction; xanthroprotein reaction.

Positive.—Anthrone reaction; Schriwanoff's reaction; Molisch's reaction; conc. sulphuric acid reaction; tetrazolium reaction.

Formula.—According to our experimental studies and determinations, the aforementioned new antibotic compounds $A_3$–$A_9$ are of the formula:

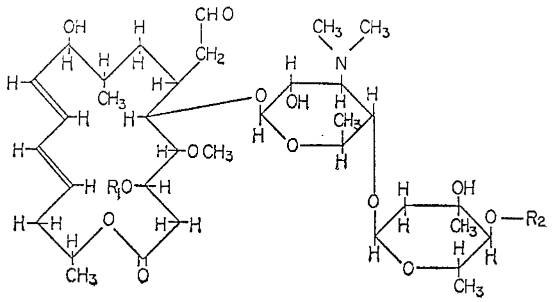

wherein $R_1$ is hydrogen and $R_2$ is acetyl, propionyl or butyryl; or wherein $R_1$ is acetyl and $R_2$ is acetyl, propionyl, butyryl or isovaleryl.

A clear understanding may be obtained by reference to the following Table II:

TABLE II

| Designation of Compound | Molecular formula | Radical $R_1$ | Radical $R_2$ |
|---|---|---|---|
| $A_3$ | $C_{42}H_{69}NO_{15}$ | $-C(=O)-CH_3$ | $-C(=O)-CH_2-CH(CH_3)-CH_3$ |
| $A_4$ | $C_{41}H_{67}NO_{15}$ | $-C(=O)-CH_3$ | $-C(=O)-CH_2-CH_2-CH_3$ |
| $A_5$ | $C_{39}H_{65}NO_{14}$ | $-H$ | $C(=O)-CH_2-CH_2-CH_3$ |
| $A_6$ | $C_{40}H_{65}NO_{15}$ | $-C(=O)-CH_3$ | $-C(=O)-CH_2-CH_3$ |
| $A_7$ | $C_{38}H_{63}NO_{14}$ | H | $-C(=O)-CH_2-CH_3$ |
| $A_8$ | $C_{39}H_{63}NO_{15}$ | $-C(=O)-CH_3$ | $-C(=O)-CH_3$ |
| $A_9$ | $C_{37}H_{61}NO_{14}$ | H | $-C(=O)-CH_3$ |

These properties of $A_3$-, $A_4$-, $A_5$-, $A_6$-, $A_7$-, $A_8$-, and $A_9$-compounds serve to distinguish from those of other known macrolide antibiotics such as Spiramycin, Carbomycin, Erythromycin, Methymycin and Oleandomycin, by having different chemical structures.

Of those antibotics denoted in the prior art, Leucomycin $A_2$, $-B_1$, $-B_2$, $-B_3$ and $-B_4$ are different from the compounds $A_3$–$A_9$ in their physiocochemical properties.

The antimicrobial spectra of the novel antibotic compounds are shown in the following Table III.

TABLE III

| Test organism | Minimum inhibitory concentration γ/ml. | | | | | | | |
|---|---|---|---|---|---|---|---|---|
| | $A_3$-comp. | $A_4$- | $A_5$- | $A_6$- | $A_7$- | $A_8$- | $A_9$- | Comp. of $A_3$–$A_9$ |
| *Staphylococcus aureus* FDA 209P | 0.15 | 0.15 | 0.08 | 0.3 | 0.15 | 0.3 | 0.6 | 0.2 |
| *Staphylococcus albus* | 5.0 | 2.5 | 2.5 | 2.5 | 5.0 | 5.0 | >10 | 2.5 |
| *Staphylococcus aureus* LM, EM R [1] | >10 | >10 | >10 | >10 | >10 | >10 | >10 | >10 |
| *Micrococcus flavus* | 0.3 | 0.3 | 0.15 | 0.6 | 0.15 | 0.3 | 0.6 | 0.3 |
| *Bacillus subtilis* PCI 219 | 0.6 | 1.25 | 0.3 | 1.25 | 0.3 | 1.25 | 2.5 | 0.6 |
| *Bacillus anthracis* | 1.25 | 1.25 | 0.3 | 1.5 | 0.6 | 1.25 | 1.25 | 1.25 |
| Mycobacterium ATCC 607 | >10 | >10 | >10 | >10 | >10 | >10 | >10 | >10 |
| *Mycobacterium avium* | >10 | >10 | >10 | >10 | >10 | >10 | >10 | >10 |
| *Nocardia asteroides* | 2.5 | 0.6 | 2.5 | 0.6 | 2.5 | 5 | 10 | 2.5 |
| *Escherichia coli* NIHJ | >10 | >10 | >10 | >10 | >10 | >10 | >10 | >10 |
| *Escherichia coli* B | >10 | >10 | >10 | >10 | >10 | >10 | >10 | >10 |
| *Salmonella typhosa* H 901 W | >10 | >10 | >10 | >10 | >10 | >10 | >10 | >10 |
| *Salmonella typhimurium* | >10 | >10 | >10 | >10 | >10 | >10 | >10 | >10 |
| *Shigella dysenteriae* E-1 | 5 | 5 | 5 | 5 | 5 | >10 | >10 | 5 |
| *Shigella flexneri* E-20 | 5 | 5 | 5 | 5 | 5 | >10 | >10 | 5 |
| *Shigella sonnei* E-33 | 5 | 5 | 5 | 5 | 5 | 5 | >10 | 5 |
| *Vibrio comma* type A | 0.8 | 0.8 | 0.8 | 0.8 | 0.8 | 0.8 | 0.8 | 0.8 |
| *Streptococcus hemolyticus* | 0.15 | 0.3 | 0.15 | 0.3 | 0.15 | 0.6 | 1.25 | 0.3 |
| *Diplococcus pneumoniae* II | 0.08 | 0.15 | 0.08 | 0.3 | 0.08 | 0.15 | 0.3 | 0.08 |
| *Corynebacterium diphtheriae* | 0.04 | 0.15 | 0.04 | 0.3 | 0.08 | 0.3 | 0.6 | 0.04 |
| *Neisseria gonorrhoeae* | 0.6 | 0.6 | 0.3 | 0.6 | 0.6 | 1.25 | 5.0 | 0.6 |
| *Hemophilus influenza* | 0.15 | 0.15 | 0.15 | 0.3 | 0.15 | 0.3 | 0.6 | 0.2 |
| *Pseudomnas aeruginosa* | >10 | >10 | >10 | >10 | >10 | >10 | >10 | >10 |
| *Proteus vulgaris* OX19 | >10 | >10 | >10 | >10 | >10 | >10 | >10 | >10 |
| *Klebsiella pneumoniae* PCI 602 | 10 | 10 | 5 | 10 | 10 | >10 | >10 | 10 |
| *Piricuralia oryzae* | >10 | 10 | >10 | 10 | >10 | >10 | >10 | >10 |
| *Alternaria sowbinettii* | >10 | >10 | >10 | 10 | >10 | >10 | >10 | >10 |
| *Microsporium gypseeum* | >10 | >10 | >10 | 10 | >10 | >10 | >10 | >10 |
| *Trichophyton asteroides* | >10 | >10 | >10 | 10 | >10 | >10 | >10 | >10 |
| *Candida albicans* | >10 | >10 | >10 | >10 | >10 | >10 | >10 | >10 |
| *Saccharomyces cerevisiae* | >10 | >10 | >10 | >10 | >10 | >10 | >10 | >10 |
| *Aspergillus niger* | >10 | >10 | >10 | >10 | >10 | >10 | >10 | >10 |
| *Penicillium glaucum* | >10 | >10 | >10 | >10 | >10 | >10 | >10 | >10 |
| *Cryptococcus neoformans* | >10 | >10 | >10 | >10 | >10 | >10 | >10 | >10 |
| *Sporotrium sienkii* | >10 | >10 | >10 | >10 | >10 | >10 | >10 | >10 |
| *Torula utilis* | >10 | >10 | >10 | >10 | >10 | >10 | >10 | >10 |

[1] Resistant strain for Leucomycin and Erythromycin.

Acute toxicity, $LD_{50}$ in mice of the novel antibiotic composition and compounds, as determined by intravenous and peroral doses, is shown in the following Table IV:

TABLE IV

| Composition or compounds | Toxicity, i.v., $LD_{50}$, mg./kg. | Toxicity peroal, $LD_{50}$, mg./kg, |
|---|---|---|
| Composition $A_3$–$A_9$ | >650 | >1,000 |
| $A_3$-compound | >650 | >1,000 |
| $A_4$-compound | >500 | >1,000 |
| $A_5$-compound | >500 | >1,000 |
| $A_6$-compound | >500 | >1,000 |
| $A_7$-compound | >500 | >1,000 |
| $A_8$-compound | >500 | >1,000 |
| $A_9$-compound | >500 | >1,000 |

EXAMPLE 1

Preparation of activity in shaker bottles 100 milliliters of an aqueous culture medium comprising peptone 0.5%, meat extract 0.5%, glucose 2%, common salt 0.3%, dry yeast 0.3%, and calcium carbonate 0.3% were introduced into a 500-milliliter Sakaguchi flask, adjusted to pH 7, sterilized at 120° C. with steam at 15 p.s.i. for about 60 minutes, inoculated with *Streptomyces kitasatoensis* and then reciprocally shake cultured at 27° C. for 72 hours.

Next, 1 liter of a fermentation medium comprising soy bean powder 3%, corn steep liquor 2%, starch 2%, glucose 1%, sodium chloride 0.3%, calcium carbonate 0.5%, potassium phosphate dibasic 0.1%, magnesium sulfate 0.05%, potassium chloride 0.05% and manganese sulfate 0.0003% was equally divided and introduced into ten Sakaguchi flasks having each a volumertic capacity of 500 milliliters, thus each flask containing 100 milliliters of said medium. After sterilization, 1 milliliter of the incubated and cultured medium in the foregoing stage was transferred to each of said prepared flasks which are then incubated on a reciprocating shaker at 27° C. for 96 hours. The broth gathered from all the flasks contained a mixture of the new antibiotics, or $A_3$-, $A_4$, $A_6$-, $A_7$-, $A_8$- and $A_9$-compounds, 550 mcg./ml. when calculated on the basis of the corresponding amount of the normal standardized Leucomycin. It was then filtered off for removal of the mycelia.

800 milliliters of the filtrate was adjusted to a pH of 8.5, extracted twice with benzene, 300 milliliters, and the benzene phase was further extracted twice with aqueous hydrochloric acid, 150 milliliters, of pH 3.5. The aqueous phase was adjusted to pH 8.5 and extracted twice with 100 milliliters of benzene. The benzene extract was dehydrated over anhydrous sodium sulfate and freeze-dried. In this way, a mixture of antibiotics $A_3$ to $A_9$ was obtained as white powder. Yield: 400 milligrams.

EXAMPLE 2

The last benzene extract obtained in the foregoing example was further extracted with 50 milliliters of aqueous hydrochloric acid, pH 3, and the aqueous phase was separated and adjusted to pH 9 to precipitate the antibiotics. Other treating conditions and procedures were substantially the same as employed in the foregoing example. The antibiotics were in the form of white powder. Yield: 340 milligrams.

EXAMPLE 3

Large scale production of antibiotics

An equeous culture medium comprising peptone 0.5%, meat extract 0.5%, glucose 2%, sodium chloride 0.5%, dry yeast 0.3% and calcium carbonate 0.3%, made up in a volume of 100 milliliters, and introduced into a 500-milliliter Sakaguchi flask, adjusted to pH 7, sterilized in usual manner, inoculated with *Streptomyces kitasatoensis* and then cultured at 27° C. for 72 hours with reciprocal shaking.

The fermented broth was inoculated under completely aseptic conditions to 20 liters of a fermentation medium comprising soy bean powder 3%, starch 2%, glucose 1%, sodium chloride 0.5%, ammonium sulfate 0.3%, dry yeast 0.5%, calcium carbonate 0.3%, potassium phosphate dibasic 0.1% and urea 0.01% and contained in a 30-liter jar fermenter already sterilized.

The fermentation mixture was incubated at 27° C. for 50 hours while agitating by an impeller revolving at 250 revolutions per minute and with sterile air being forced through at a rate of 20 liters per minute.

The broth was then transferred aseptically to a 400-liter stainless steel fermenter tank and mixed evenly with 200 liters of fermentation medium of th same composition as that disclosed above and contained therein.

The mixture in the tank was further incubated at 27° C. for 85 hours while being agitated by an impeller rotating at 200 revolutions per minute and aerated with sterile air at the rate of 200 liters per minute. At the end of the incubation, the broth contained a mixture of the aforementioned seven kinds of antibiotics, 1200 mcg./ml., when convertedly calculated to the corresponding quantity of the normal and standardized Leucomycin. 160 liters of the filtrate obtained from the broth after centrifugal removal of the mycelia were adjusted to pH 8 and extracted twice with 50 liters of butyl acetate. The separated butyl acetate phase was adjusted to pH 3 by the addition of 30 liters of aqueous hydrochloric acid of pH 3, agitated strongly and the separated aqueous phase was adjusted to pH 8.5, and then extracted twice with 8 liters of butyl acetate. The butyl acetate phase was extracted with 6 liters of aqueous hydrochloric acid of pH 3.5. The aqueous phase, after being adjusted to pH 9, was extracted twice with 6 liters of benzene. The benzene phases were collected together and subjected to concentration under vacuo. In this way, 130 grams of the antibiotic mixture were obtained in the form of white powder free base. The potency: 1150 mcg./mg.

EXAMPLE 4

Preparation and isolation of compound $A_3$ 250 milligrams of the white powder product were dissolved in 1 milliliter of benzene and the solution was poured into the top end of a chromatographic column, having a diameter of 1 centimeter and filled with 10 grams of silica gel in benzene. Then, the column was washed with benzene thoroughly. Next, a benzene/acetone mixture, of ratio 5:1, was passed through the column at a flow rate of ¼ v.v.h. (which means a rate of hourly flow corresponding to a quarter of the quantity of th silica gel). The eluate was collected in a large number of tubes in the quantity of 1 milliliter per tube, using a fraction collector. Upon investigating the composition of the content of each tube relying upon the thin layer chromatographic method, it was found that the tubes Nos. 15–25 contained considerable amounts of the compound $A_3$.

The contents of the above specified tubes were collected together and the solvent was distilled off under vacuo. The residual was dissolved in benzene at 60° C., and left over night in an ice-cooled chamber. The crystalline product, compound $A_3$, was obtained as free base in white prisms. Yield: 30 milligrams.

EXAMPLE 5

Isolation of compound $A_3$ 4 grams of white powder product obtained in Example 3 were subjected to counter current distribution a solvent system of benzene/chloroform/methanol/1/15 mol. citric acid buffer, pH 4.9 (mixing ratio by weight—20:6:20:8), and transferred to 300 tubes, each of which collected 10 milliliters of the treated solvent. Upon investigating into the tube contents relying upon the silica gel thin layer chromatography, it was found that the tubes specified as Nos. 65–80 contained considerable amounts of the compound $A_3$. These tube contents were then collected together and treated as before, so as to isolate the free base of compound which was in the form of white powder. Yield: 350 milligrams.

Thus obtained compound $A_3$ was dissolved in 5 milliliters of ethylether and dropped into 5 milliliters of 2 percent solution of tartaric acid in ethylether with stirring. Precipitated compound $A_3$-tartrate was washed with ethylether and dried after isolation. Yield: 400 milligrams.

EXAMPLE 6

Isolation of compound $A_4$

Among the tubes treated in the foregoing Example 4 the contents of those specified Nos. 28–35 were collected together and distilled under vacuo for removal of the solvent. The residual white powder was dissolved in 1 milliliter of benzene and poured into the top end of a chromatographic column, 6 millimeter dia., filled with 5 grams of silica gel mixed with a proper guantity of benzene, and then a solvent mixture of benzene and acetone, 4:1, was passed through the column as rechromatography. The resulting solvent solution was then distilled off and the residual was recrystalized from hot benzene. The thus obtained crystalline compound $A_4$ free base was in the form of white prisms. Yield: 20 milligramss.

EXAMPLE 7

Isolation of compound $A_4$

The contents of the tubes specified as Nos. 95–115 in Example 5 were collected together and treated in the usual method as before. In this way, the compound $A_4$ was obtained as white powder. Yield: 294 milligrams.

EXAMPLE 8

Isolation of compound $A_5$

The contents of the tubes specified as Nos. 45–68 in Example 4 were collected together and treated by the chromatographic technique (eluted with a solvent mixture of benzene and acetone, 3:1) as before. In this way, the compound $A_5$ free base as white powder was obtained. Yield: 35 milligrams

EXAMPLE 9

Isolation of compound $A_5$

The contents of the tubes specified as Nos. 171–295 in Example 5 were collected together and treated as before. Yield of the compound $A_5$: 480 milligrams.

EXAMPLE 10

Isolation of the compound $A_6$ 250 milligrams of the white powder product obtained in Example 3 were dissolved in 1 milliliter of benzene and the solution was poured into the top end of a chromatographic column, 1 centimeter in diameter and filled with 10 grams of silica gel in benzene, and charged. The charged column was washed by eluating with benzene thoroughly. Next, a benzene/acetone mixture, of ratio 4:1, was passed through the column at a flow rate of ¼ v.v.h. (which is explained above). The eluate was dividingly collected in a large number of tubes in a quantity of 1 milliliter per tube, using a fraction collector.

The contents of the tubes numbered No. 26–40 were collected together and distilled off for removal of the solvent. The residual white powder was dissolved in 1 milliliter of benzene and poured from the top end of a chromatographic column, 6 millimeters in diameter, filled with 5 grams of activated alumina mixed with a suitable quantity of benzene. Then, a solvent mixture of benzene/ethyl acetate (2:3) was passed through the column as a second chromatographic stage. The effluent was distilled off in vacuo and the residue was recrystallized from hot benzene. The product was obtained in white prisms and the yield of the compound $A_6$ free base amounted to 15 milligrams.

EXAMPLE 11

Isolation of compound $A_6$ 35 grams of the white powder product obtained in Example 3 were dissolved in 70 milliliters of benzene, and the solution was poured onto a chromatographic column, 10 centimeters in diameter and charged with 900 grams of silica gel in benzene. The charged column was washed with benzene throughly. Then, a benzene/acetone mixture, of ratio 4:1, was passed through the column at a flow rate of ¼ v.v.h. The eluate was collected each 20 milliliters using a fraction collector.

The contents of the tubes numbered Nos. 130–170 were collected together and distilled off the solvent in vacuo. The residual white powder was dissolved in 20 milliliters of benzene and then poured into the top end of a second chromato-column, of 3 centimeters in diameter, filled with 100 grams of activated alumina mixed with a proper quantity of benzene. Then, a solvent mixture, benzene/ethyl acetate (2:3) was passed through the column. The eluate was collected, distilled off in vacuo and recrystallized from hot benzene. The thus purified product or the compound $A_6$ was in the form of white crystals. Yield: 800 milligrams.

EXAMPLE 12

Isolation of the compound $A_7$ 250 milligrams of the white powder product obtained in Example 3 were dissolved in 1 milliliter of benzene, and the solution was poured into the top end of a chromatographic column, 1 centimeter in diameter and filled with 10 grams of silica gel in benzene, and charged. The charged column was washed with benzene. Next, a benzene/acetone mixture, of ratio being 3:1, was passed through the column at a flow rate of ¼ v.v.h. The eluate was collected each 1 milliliter using a fraction collector.

The contents of the tubes specified as Nos. 35–55 were collected together and the solvent distilled off in vacuo the obtained white powder residue was dissolved in a small quantity of benzene and subjected to a second chromatographic treatment as before. In this way, the compound $A_7$ in the form of crystalline white powder was isolated. Yield: 10 milligrams.

EXAMPLE 13

Isolation of compound $A_7$

The contents of the tubes specified as Nos. 220–245 in Example 5 were collected together and subjected to further treatment as before. A crude white powder, 200 mg., of the compound $A_7$ was obtained. This crude product was treated further chromatographically in substantially the same manner as in the case of the foregoing Example 12. In this way, the compound $A_7$ free base was isolated in the form of white crystalline powder. Yield: 100 milligrams.

EXAMPLE 14

Isolation of compound $A_8$

The contents of the tubes specified as Nos. 30–40 in the first half of Example 12 were collected together and the solvent was distilled off in vacuo, and the obtained white powder was dissolved in a small quantity of benzene and subjected to aforementioned rechromatographic treatment. In this way, the compound $A_8$ free base in the form of white crystal was isolated. Yield: 5 milligrams.

EXAMPLE 15

Isolation of compound $A_8$ 35 grams of white powder obtained in Example 3 were dissolved in 70 milliliters of benzene, and the solution was poured into the top of a chromatographic column 6 centimeters in diameter, filled with 700 grams of activated alumina in benzene, and charged. After washing with benzene, a mixture of benzene and ethyl acetate (1:2 in ratio) was passed through the column at a flow rate of ¼ v.v.h. The eluate was collected each 20 milliliters individually. The contents of each of the tubes were checked by the method of thin layer chromatography. Compound $A_8$ was shown to be contained in tubes Nos. 13–40. The contents of these tubes were collected together and distilled off in vacuo. The residue was dissolved in 30 milliliters of benzene and then poured into the top of a chromatographic column, 5 centimeters in diameter, filled with a mixture of 375 grams of silica gel and a suitable volume of benzene. The, eluted with a solvent system of benzene/acetone (3:1) and the contents of the tubes Nos. 150–170 were collected together and dried in vacuo. The obtained residue was recrystallized from hot benzene. Compound $A_8$ was obtained in the form of white needle crystals. Yield 500 milligrams.

EXAMPLE 16

Isolation of compound $A_9$

The contents of the tubes specified as Nos. 60–70 in the first half of Example 12 were collected together and dried in vacuo, and the thus obtained white powder was dissolved in benzene and treated by aforementioned rechromatographic method. Then, the compound $A_9$ free base was isolated in the form of white crystalline powder. Yield: 20 milligrams.

EXAMPLE 17

Isolation of compound $A_9$ 35 grams of white powder obtained in Example 3 were dissolved in 70 milliliters of benzene. The solution was charged at the top of the chromatographic column, 6 centimeters in diameter, filled with a mixture of 700 grams of activated alumina and benzene. After the filled column was washed with benzene, a mixture of benzene and ethyl acetate (1:2 in ratio) was passed through the column at a flow rate of ¼ v.v.h. The eluate was collected as 20 milliliter fractions, and each fraction was checked by the method of thin layer chromatography using activated alumina. Contents of the tubes from No. 60 to No. 80 were demonstrated to be the compound $A_9$. These were collected together and concentrated to dryness in vacuo, and then, the residue was dissolved in 30 milliliters of benzene. The solution was charged into the top of a chromatographic column, of 5 centimeters in diameter, filled with a mixture of 350 grams of silica gel and benzene. Next, eluated with a solvent system of benzene/aceton (3:1), the content of the tubes Nos. 150–170 were collected together, and then dried up in vacuo. Thus isolated white powder was recrystallized from hot benzene. Compound $A_9$ was obtained in the form of white crystalline powder. Yield: 700 milligrams.

We claim:

1. An antibiotic of formula:

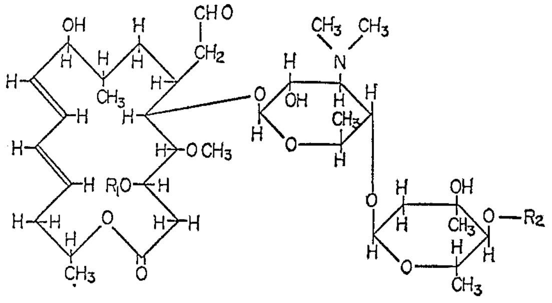

wherein $R_1$ is hydrogen and $R_2$ is acetyl, propionyl or butyryl; or wherein $R_1$ is acetyl, and $R_2$ is acetyl, propionyl, butyryl or solvaleryl.

2. An antibiotic as set forth in claim 1, wherein $R_1$ is acetyl and $R_2$ is isovaleryl.

3. An antibiotic as set forth in claim 1, wherein $R_1$ is acetyl and $R_2$ is butyryl.

4. An antibiotic as set forth in claim 1, wherein $R_1$ is hydrogen and $R_2$ is butyryl.

5. An antibiotic as set forth in claim 1, wherein $R_1$ is acetyl and $R_2$ is propionyl.

6. An antibiotic as set forth in claim 1, wherein $R_1$ is hydrogen and $R_2$ is propionyl.

7. An antibiotic as set forth in claim 1, wherein $R_1$ is acetyl and $R_2$ is acetyl.

8. An antibiotic as set forth in claim 1, wherein $R_1$ is hydrogen and $R_2$ is acetyl.

9. A non-toxic acid salt of an antibiotic substance set forth in claim 1.

References Cited

Watanabe: "Chem. Abst.," vol. 55, 1961, p. 10329(a-d).

Iwata et al.: "Jour. of Antibiotics, Ser. A," 1962, pp. 258-262.

ELBERT L. ROBERTS, Primary Examiner

U.S. Cl. X.R.

195—80; 424—180